US012542682B2

(12) United States Patent
Laing et al.

(10) Patent No.: US 12,542,682 B2
(45) Date of Patent: Feb. 3, 2026

(54) AUTHENTICATING PACKAGED PRODUCTS

(71) Applicant: Hewlett-Packard Development Company, L.P., Spring, TX (US)

(72) Inventors: Thalia May Laing, Bristol (GB); Christopher Ian Dalton, Bristol (GB); Gabriel Scott McDaniel, Boise, ID (US); Paul L. Jeran, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 148 days.

(21) Appl. No.: 18/256,314

(22) PCT Filed: Dec. 14, 2020

(86) PCT No.: PCT/US2020/064860
§ 371 (c)(1),
(2) Date: Jun. 7, 2023

(87) PCT Pub. No.: WO2022/132125
PCT Pub. Date: Jun. 23, 2022

(65) Prior Publication Data
US 2024/0056312 A1    Feb. 15, 2024

(51) Int. Cl.
*H04L 9/32*    (2006.01)
(52) U.S. Cl.
CPC .................................. *H04L 9/3255* (2013.01)
(58) Field of Classification Search
CPC ..................................................... H04L 9/3255
See application file for complete search history.

(56) References Cited

U.S. PATENT DOCUMENTS 7,900,819 B2    3/2011    Silverbrook et al.
8,001,016 B2    8/2011    Balinsky et al.
(Continued)

FOREIGN PATENT DOCUMENTS

JP          2015-231133 A     12/2015
WO    WO-2022154790 A1 *    7/2022    ............. G06F 21/44

OTHER PUBLICATIONS

Boneh, D., Gentry, C., Lynn, B., Shacham, H. (2003) "Aggregate and Verifiably Encrypted Signatures from Bilinear Maps" In: Biham , E. (eds) Advances in Cryptology—EUROCRYPT 2003. EUROCRYPT 2003. Lecture Notes in Computer Science, vol. 2656. Springer, Berlin, Heidelberg (Year: 2003).*

(Continued)

*Primary Examiner* — Rupal Dharia
*Assistant Examiner* — Devin E Almeida
(74) *Attorney, Agent, or Firm* — Quarles & Brady LLP

(57) ABSTRACT

Example implementations provide a computer program product for authenticating a number of grouped product-packaging pairs, in which each product-packaging pair comprises a respective message, associated with a respective product, and a respective signature associated with the message; the computer program product comprising machine executable instructions arranged, when processed, to: read the product messages and the signatures from the grouped product-packaging pairs; determine and store bilinear computation results associated with each of the messages, and each of the signatures; and determine, from the stored bilinear computation results, whether or not at least one product-packaging pair of the number of grouped product-packaging pairs is authentic.

15 Claims, 6 Drawing Sheets

(56) References Cited

U.S. PATENT DOCUMENTS

| | | | |
|---|---|---|---|
| 8,316,422 B2* | 11/2012 | Hofmann | H04L 9/3263 726/10 |
| 2003/0182238 A1* | 9/2003 | Brookner | G06K 7/1417 705/62 |
| 2005/0049979 A1 | 3/2005 | Collins et al. | |
| 2005/0262353 A1* | 11/2005 | Gentry | H04L 9/3247 713/176 |
| 2005/0262354 A1* | 11/2005 | Komano | H04L 9/3255 713/177 |
| 2008/0133920 A1* | 6/2008 | Gupta | H04L 63/08 713/175 |
| 2012/0213366 A1* | 8/2012 | Brown | H04L 9/3252 380/270 |
| 2012/0284514 A1* | 11/2012 | Lambert | H04L 9/3263 713/168 |
| 2017/0032381 A1 | 2/2017 | Vaidyanathan | |
| 2018/0240134 A1 | 8/2018 | Camenisch et al. | |
| 2019/0367239 A1 | 12/2019 | Camenisch et al. | |
| 2022/0141022 A1* | 5/2022 | Tomar | H04L 9/3226 713/168 |
| 2023/0033216 A1* | 2/2023 | Qiu | H04L 9/0869 |

OTHER PUBLICATIONS

G. Swapna and P. Vasudeva Reddy 2019 "Efficient identity based aggregate signcryption scheme using bilinear pairings over elliptic curves" J. Phys.: Conf. Ser. 1344 012010 (Year: 2019).*

* cited by examiner

200

AUTHENTICATING PACKAGED PRODUCTS

BACKGROUND

An authentic printer cartridge toner manufacturer may manufacture and distribute products that are certified as originating from the manufacturer. Authentication data can be used as proof of origin and proof of authenticity. An auditor can use authentication data at any point in the supply chain to determine whether or not products are packaged in their correct packaging. For unadulterated or tamper-free products, any authentication data associated with the product and packaging will be valid.

BRIEF DESCRIPTION OF THE DRAWINGS

Example implementations will now be described, by way of example, with reference to the accompanying drawings in which.

DETAILED DESCRIPTION

Figure 1:
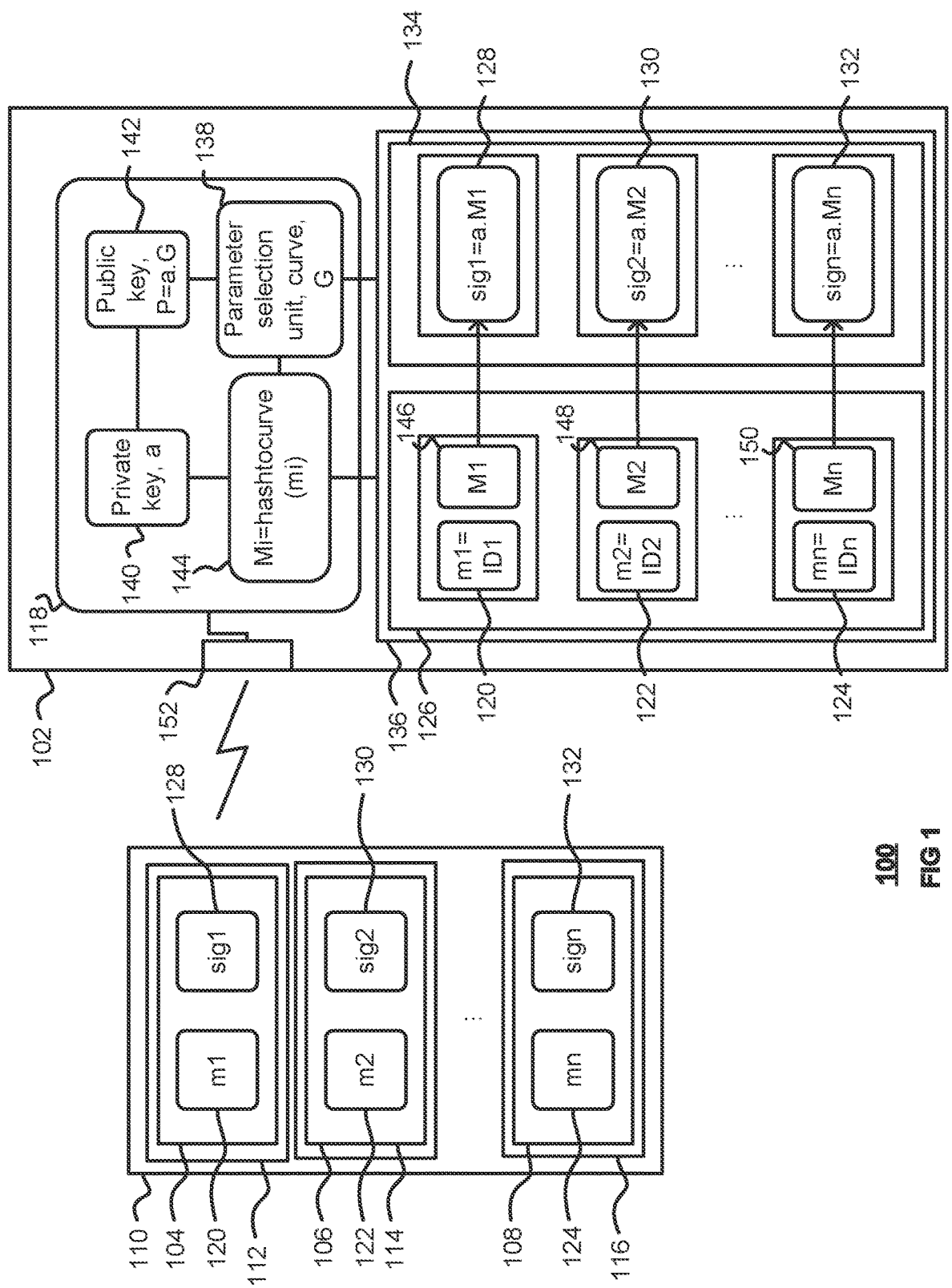
FIG. 1 shows a system for creating and assigning authentication data to packaged products according to example implementations.

Referring to FIG. 1, there is shown a view 100 of a system 102 for creating and assigning authentication data 104 to 108 to a plurality 110 of packaged products. The packaged products 110 comprise N products 112 to 116. One or more of the products 112 to 116 may be physically inaccessible. Example implementations can be realised in which N>1. For example, implementations can be realised in which N>100. A product and a respective package for that product is an example of a product-packaging pair.

The products 112 to 116 can comprise any products. Example implementations can be realised in which the products 112 to 116 are printer products such as, for example, replaceable printer cartridges, and the plurality 110 of products can be a pallet or other collection of such printer cartridges. The printer cartridges can be toner printer cartridges, ink printer cartridges or some other printer components.

The system 102 comprises a processor 118. The processor 118 has access to a list of product messages, $m_i$, 120 to 124 stored in a memory 126 of the system 102, or otherwise accessible to the system 102. The messages, $m_i$, 120 to 124 can comprise product identifiers. The messages, $m_i$, 120 to 124 are to be assigned to, or otherwise associated with, respective products of the plurality 110 of products together with respective signatures 128 to 132. The respective signatures are also stored in a memory 134. The memories 126 and 134 can form part of a common overall memory 136 or be distinct memories.

The processor 118 comprises an encryption or curve parameter selection unit 138. The encryption or curve parameter selection unit 138 is arranged to produce the authentication data 104 to 108. Example implementations can be realised in which the encryption parameter selection unit 138 uses elliptic curve cryptography to produce the authentication data 104 to 108. The encryption parameter selection unit 138 can select a curve together with a respective base point, G, to be used for the cryptography. The curve can be an elliptic curve. The elliptic curve can be a pairing friendly curve such as, for example, a Barreto-Lynn-Scott curve such as, for example, BLS12-381, or any other pairing friendly curve. A pairing friendly curve is a curve that is suitable for use in pairing-based cryptography.

The processor 118 can generate, or can otherwise access, a private key, a, 140 to be used in the cryptography. The private key 140 is used to generate a public key, P, 142 to be used in the cryptography. Example implementations can be realised in which the private and public keys are related by P=a·G, that is, "a dot G", which represents scalar multiplication of a and G.

The processor 118 also comprises, or also has access to, a hash function 144. The processor uses the hash function to hash, in general, a message, $m_i$, onto the elliptic curve. The message, $m_i$, can comprise any data. Example implementations will be realised in which the message, $m_i$, comprises at least one or more than one product identifier of the product identifiers. Therefore, the hash function 144 is arranged to process the messages, $m_i$, 120 to 124 to produce corresponding points $M_1, M_2, \ldots, M_n$, 146 to 150 on the curve used for the cryptography, which is known as hashing to the curve.

Although example implementations have been described with reference to the $i^{th}$ message, $m_i$, being the $i^{th}$ product identifier, example implementations are not limited to such arrangements. Example implementations can be realised in which the $i^{th}$ message, $m_i$, comprises additional, or alternative, data. For example, the message can additionally, or alternatively, comprise at least one or more than one of a date and/or time of manufacture or other date and/or time, identifier data, an indication of origin, product name, product number, or product serial number, taken jointly and severally in any and all permutations. The additional identifier data can relate to, for example, a manufacturing or shipping batch identifier.

The signatures 128 to 132 are produced such that the $i^{th}$ signature, sig_i, is produced using the $i^{th}$ message, $m_i$, more particularly, an $i^{th}$ hash to the curve, $M_i$, of the $i^{th}$ message, $m_i$, the private key, a, and the selected curve parameters. Example implementations can be realised in which the signatures are Boneh-Lynn-Shacham signatures. Therefore, example implementations can be realised in which the signatures 128 to 132 are produced from $sig_i = a \cdot M_i = a \cdot hash(m_i)$, where, again, the "dot" operator represents the above described a scalar multiplication of the private key, a, and $M_i$. For example implementations that use the points $M_1, M_2, \ldots, M_n$ 146 to 150 as the hash to the curve of the messages, mi, the points $M_1, M_2, \ldots, M_n$ 146 to 150 are used to produce the respective signatures 128 to 132. Example implementations can be realised in which the $i^{th}$ message, $m_i$, is, or is associated with, the $i^{th}$ product or $i^{th}$ component $ID_i$. Therefore, example implementations can be realised in which the respective signatures 128 to 132 are produced using the messages, $m_i$, using $sig_i = a \cdot M_i = a \cdot hash(m_i)$, that is, "a dot hash(mi)". For example implementations in which each message, $m_i$, corresponds to a respective product identifier, $ID_i$, the respective signatures are determined using $sig_1 = a \cdot M_1 = a \cdot hash(m_1)$, $sig_2 = a \cdot M_2 = a \cdot hash(m_2)$, ..., $sig_n = a \cdot M_n = a \cdot hash(m_n)$.

The points 146 to 150 and the signatures are used as inputs to form bilinear pairs. A pairing is a non-degenerate bilinear map $$e: G_1 \times G_2 \rightarrow G_T,$$

where $G_1$, $G_2$, and $G_T$ are cyclic subgroups of the same prime order p. Example implementations can be realised in which $G_1$, and $G_2$ are subgroups of points on an elliptic curve, E, defined over a prime field $\mathbb{F}_p$, and $G_T$ is a subgroup of the multiplicative group of a respective extension field of $\mathbb{F}_{p^k}$, where k is a degree of E. It will be appreciated that a pairing is defined as a bilinear map e: $G_1 \times G_2 \rightarrow G_T$, that satisfies the following properties:

1. Bilinearity: For any P in $G_1$, any Q in $G_2$, and integers a, b, $e(aP,bQ) = e(bP,aQ) = e(P,Q)^{ab}$, noting that $e(aP,Q) = e(P,aQ)$;
2. Non-degeneracy: For any Q in $G_2$, $e(P,Q) = 1$ iff P=the point at infinity over the elliptic curve E, and, similarly, for any Q in $G_1$, $e(P,) = 1$ iff P=the point at infinity over the elliptic curve; and
3. Computability: For any P in $G_1$, any Q in $G_2$, the bilinear map is efficiently computable.

Therefore, a bilinear mapping defined by e( . . . ) is selected such that $e(M,P) = e(sig,G)$, where m is the message, P is the public key, sig is the signature and G is the base point on the curve. Therefore, to verify the signatures on the messages, a verifier executes a BLS verification algorithm, which involves computing two bilinear pairings for each packaged product, $e(M,P)$ and $e(sig,G)$, and verifying whether they are equal. Example implementations of e( . . . ) can be $e(x,y) = xy$ or $e(x,y) = a_1^{xy}$, where $a_1$ is a constant.

The elliptic curve E can be, for example, a BLS12 curve or a BLS48 curve, or some other pairing-friendly curve.

Verification of the authentication data 104 to 108 of the products 112 to 116, therefore, comprises computing bilinear pairs related or derived with reference to, or satisfying, the above.

The system 102 comprises an interface 152 for outputting the authentication data 104 to 108 for association with respective product-packaging pairs. Associating the authentication data 104 to 108 with respective product-packaging pairs can comprise, for example, encoding or recording the authentication data on, or in relation to, the product-packaging pairs. The authentication data 104 to 108 can be associated with the product-packaging pairs in one or more of a number of ways such as, for example, any of optically, electrically, or magnetically taken jointly and severally in any and all permutations. For example, implementations can be realised in which the authentication data 104 to 108 can be associated with the product-packaging pairs by recording the authentication 104 to 108 in respective RFID tags, printed visually on respective labels such as, for example, a QR label, bar code or other label, or magnetically encoded such as, for example, using respective magnetic stripes or other magnetic storage medium taken jointly and severally in any and all permutations. In example implementations that use RFID tags, the Transponder ID (TID) of the RFID tag can be used to form the basis of a product or component ID. Therefore, example implementations can be realised that have an ID, such as, for example, the TID, that is at least one, or both, of immutable or unique.

Furthermore, the authentication data 104 to 108 can comprise multiples parts. In the present implementation, the authentication data 104 to 108 comprises a product related part, such as, for example, a message 120 to 124 comprising the product IDs, and a signature part such as, for example, the signatures 128 to 132. The multiple parts can be associated with the product-packaging pairs using the same technology or using any permutations of the foregoing techniques for associating the authentication data 104 to 108 with the product-packaging pairs. Therefore, example implementations can be realised in which the authentication data 104 to 108 is associated with the products by recording the authentication data on one or more than one RFID tag. An RFID tag is an example implementation of an electronic device. Example implementations can be realised in which part of the authentication data 104 to 108 is recorded on an RFID tag associated with the product and another part of the authentication data 104 to 108 is recorded on an RFID tag associated with the packaging. For example, a message, $m_i$, 120 to 124 such as, for example, a product ID, can be recorded on the RFID tag associated with the product and a respective signature 128 to 132 can be recorded on an RFID tag associated with the packaging. Alternatively, example implementations can be realised in which part of the authentication data 104 to 108 is recorded on an RFID tag associated with the product and another part of the authentication data 104 to 108 is recorded visually, magnetically, or using some other technique, on the packaging. For example, a product ID 120 to 124 can be recorded on the RFID tag associated with the product and a respective signature 128 to 132 can be recorded on a QR code, barcode, magnetic medium, or using some other technique on, or associated with, the packaging.

Figure 2:
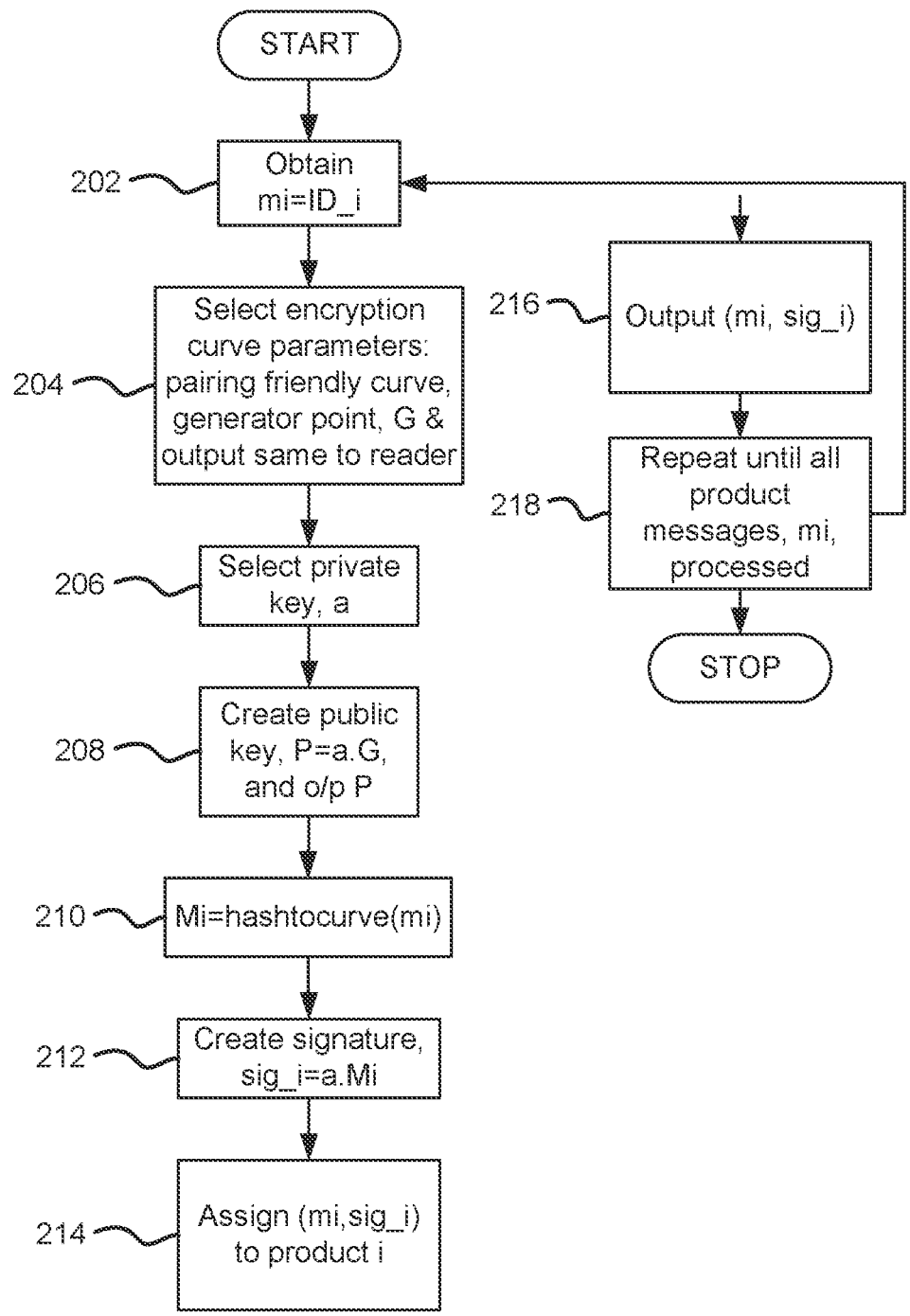
FIG. 2 illustrates a flowchart for creating and assigning authentication data to packaged products according to example implementations.

Referring to FIG. 2, there is shown a flowchart 200 for associating the authentication data 104 to 108 with product-packaging pairs. At 202, the messages, $m_i$, 120 to 124 such as, for example, the component IDs, are accessed by the processor either individually, or collectively, and stored in the memory 126 or 136. Example implementations will be described in which the messages, $m_i$, are processed one at a time with a currently processed message, $m_i$, being known as the current message, $m_i$. The elliptic curve parameters are selected or accessed at 204. The curve parameters, as indicated above, can comprise a pairing-friendly curve, and a base or generator point, G. The base or generator point, G, can also additionally be output, at 204, for associating with a reader (described below). A private key, a, is selected at 206 and used, in conjunction with the curve, to create a public key, $P = a \cdot G$ at 208. The public key, P, can be output, at 208, for association with the reader. At 210, a hash to curve, $M_i = hash(m_i)$, of the current message, $m_i$, is performed. In example implementations where $m_i = ID_i$, $M_i = hash(ID_i)$. At 212, a respective signature, sig_i, is created for the current message, $m_i$. Creating the signature can comprise a combination of the private key, a, and the hash to curve of the current message, $m_i$. Example implementations can determine the signature, sig_i, from $sig\_i = a \cdot hash(m_i)$. The foregoing creates authentication data 104 to 108 comprising ($m_i$,sig_i). At 214, the authentication data for the current product or component is associated with the current product-packaging pair. At 216, the authentication data for the current component or product is output or stored for associating with that product-packaging pair. At 218, a determination is made regarding whether or not all product or component messages, $m_i$, have been processed. If the determination at 218 is negative, the next component or product message is accessed, and processing resumes at 202 with the most recently retrieved component or product message being the current component or product message.

Once the authentication data 104 to 108 has been produced, the authentication data 104 to 108 is applied or otherwise associated with respective product-packaging pairs in a manufacturing process that ensures that the product is packaged in a package such that the authentication data associated with the product-packaging pair is correct.

Figure 3:
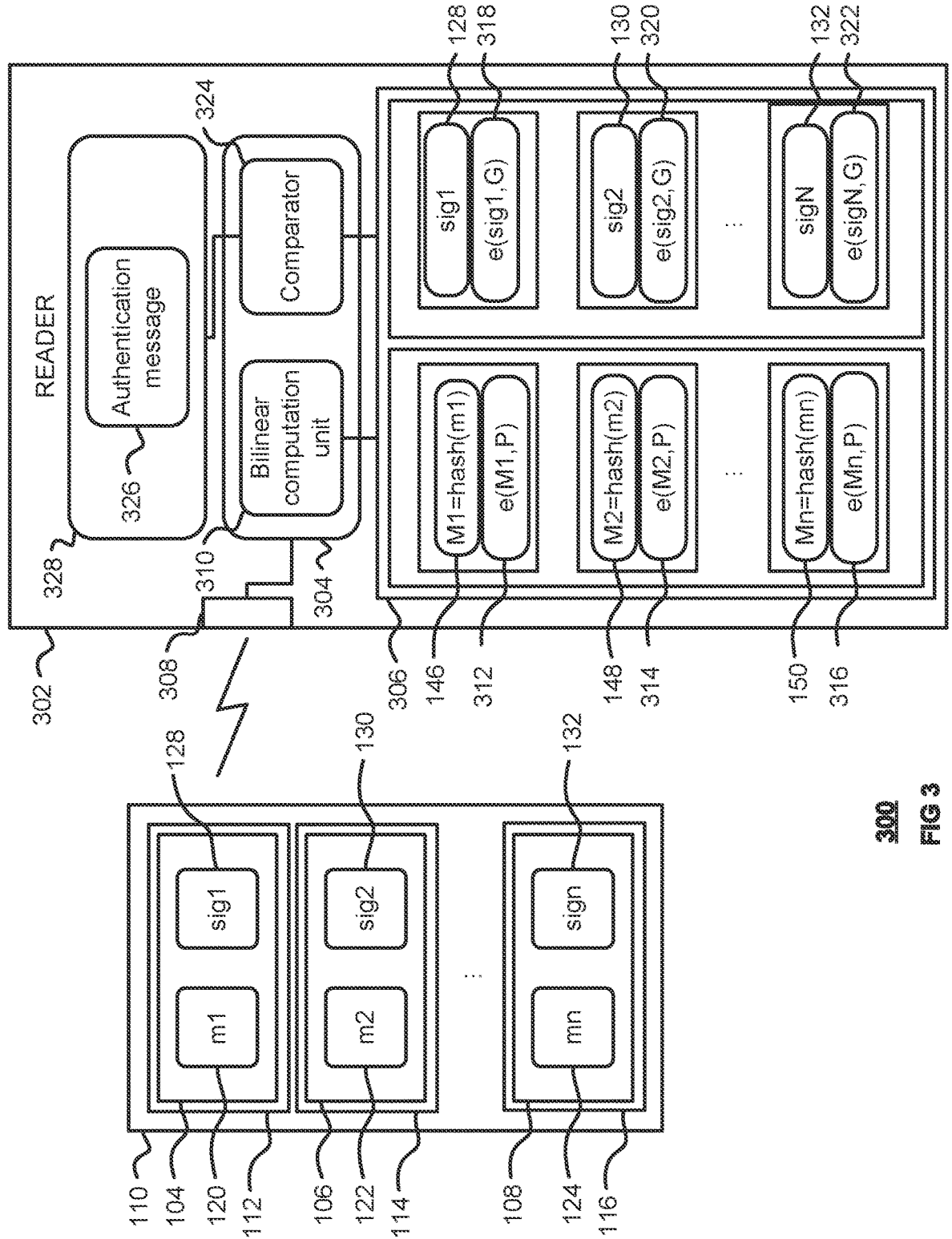
FIG. 3 depicts a system for authenticating packaged products according to example implementations.

Referring to FIG. 3, there is shown a view 300 of a reader 302 for authenticating the collection 110 of packaged products 112 to 116. The packaged products 112 to 116 comprise the above described product-packaging pairs each having respective authentication data 104 to 108 as indicated above.

The reader 302 is arranged to read and process the authentication data 104 to 108 to determine whether or not the authentication data is valid or invalid. The authentication data 104 to 108 will be held to be valid if bilinear pairings derived from the authentication data 104 to 108 match. The authentication data 104 to 108 will be held to be invalid if there is a mismatch between the bilinear pairings.

The reader 302 comprises a processor 304, and a memory 306. The reader 302 also comprises an interface 308 for reading the authentication data 104 to 108 from the collection 110 of product-packaging pairs 112 to 116. The interface 308 is constructed according to the technique used to associate the authentication data 104 to 108 with the product-packaging pairs. The read authentication data 104 to 108 is stored in the memory 306.

The processor 304 comprises a bilinear computation unit 310 that is arranged to perform bilinear computations to be used to check the bilinear pairings of the authentication data 104 to 108 associated with the product-packaging pairs. The bilinear computation unit 310 is arranged to process each of the product related authentication data 120 to 124 and to determine and store in the memory 306 respective bilinear computation results 312 to 316 using the above-described bilinear function, e( . . . ). Therefore, the bilinear computation unit 310 is arranged to evaluate and store $e(M_i,P)$, where $M_i$ is the above described hash to the curve of a respective message, $m_i$, such as, for example, a given message, $m_j$, associated with component or product ID, IDi, and P is the above described public key. The product related authentication data 120 to 124 is an example implementation of product data. The The bilinear computation unit 310 is also arranged to process each of the packaging related authentication data, that is, the signatures 128 to 132, and to determine and store in the memory 306 respective bilinear computation results 318 to 322 using the above-described bilinear function. Therefore, the bilinear computation unit 310 is arranged to compute and store $e(\text{sig\_i},G)$, where sig_i is the above described signature associated with the $i^{th}$ component or product and G is the above-described base or generator point. The packaging related authentication data 128 to 132 is an example implementation of packaging data.

The reader 302 can further comprise a comparator 324. The comparator 324 can be realised as part of the processor 310. The comparator 324 is arranged to compare the bilinear computation results 312 to 316 associated with the components or products with the bilinear computation results 318 to 322 associated with the signatures 128 to 132. A matching pair of bilinear processing results will be found for any product that is correctly packaged. For each matching pair of bilinear computation results, that is, for each instance of $e(M_i,P)=e(\text{sig\_i}, G)$, an authentically packaged product has been identified. Conversely, for each product for which the comparator 324 cannot identify a corresponding signature, an inauthentic or invalid product-packaging pair has been identified, that is, if there are any product-packaging pairs for which there is no corresponding matching bilinear computation result, $e(M_i,P)=e(\text{sig\_i},G)$, having processed all authentication data 104 to 108, those product-packaging pairs are deemed to be inauthentic or invalid. One or more messages 326 regarding the authentication status, that is, authentic/valid or inauthentic/invalid, can be output on a display 328 of the reader 302, or be otherwise output for further processing.

The further processing can comprise outputting data relating to at least one, or both, of the authenticity or otherwise of the number of grouped components. For example, example implementations can be realised in which one or more than one of: the number of authentic components is output, the number of inauthentic components is output, a percentage indication of at least one, or both, of authentic or inauthentic components is output, taken jointly and severally in any and all permutations or, additionally or alternatively to the foregoing list, in the case of using an aggregate signature, an indication of whether or not the group of components is valid or invalid, that is, whether or not the group of components comprises authentic product-packaging pairs and/or inauthentic product-packaging pairs.

It will be appreciated that storing the authentication data 104 to 108 using RFID tags has the benefit that the authentication data can be read substantially simultaneously, and that the authentication data can be read from packages that are physically inaccessible. For example, a pallet of packaged products may comprise many tens or hundreds of packaged products, the majority of which can be physically inaccessible. Providing that all packaged products are within the range of operation of the reader 302, all authentication data 104 to 108 will be read by the reader 302.

Furthermore, performing the bilinear computations is a computationally intensive task. Suitably, by determining each bilinear computation, and storing the results, the number of bilinear computations needed to verify, or otherwise authentic, a number of packaged products can be dramatically reduced compared to repeatedly calculating bilinear computations for each comparison.

Figure 4:
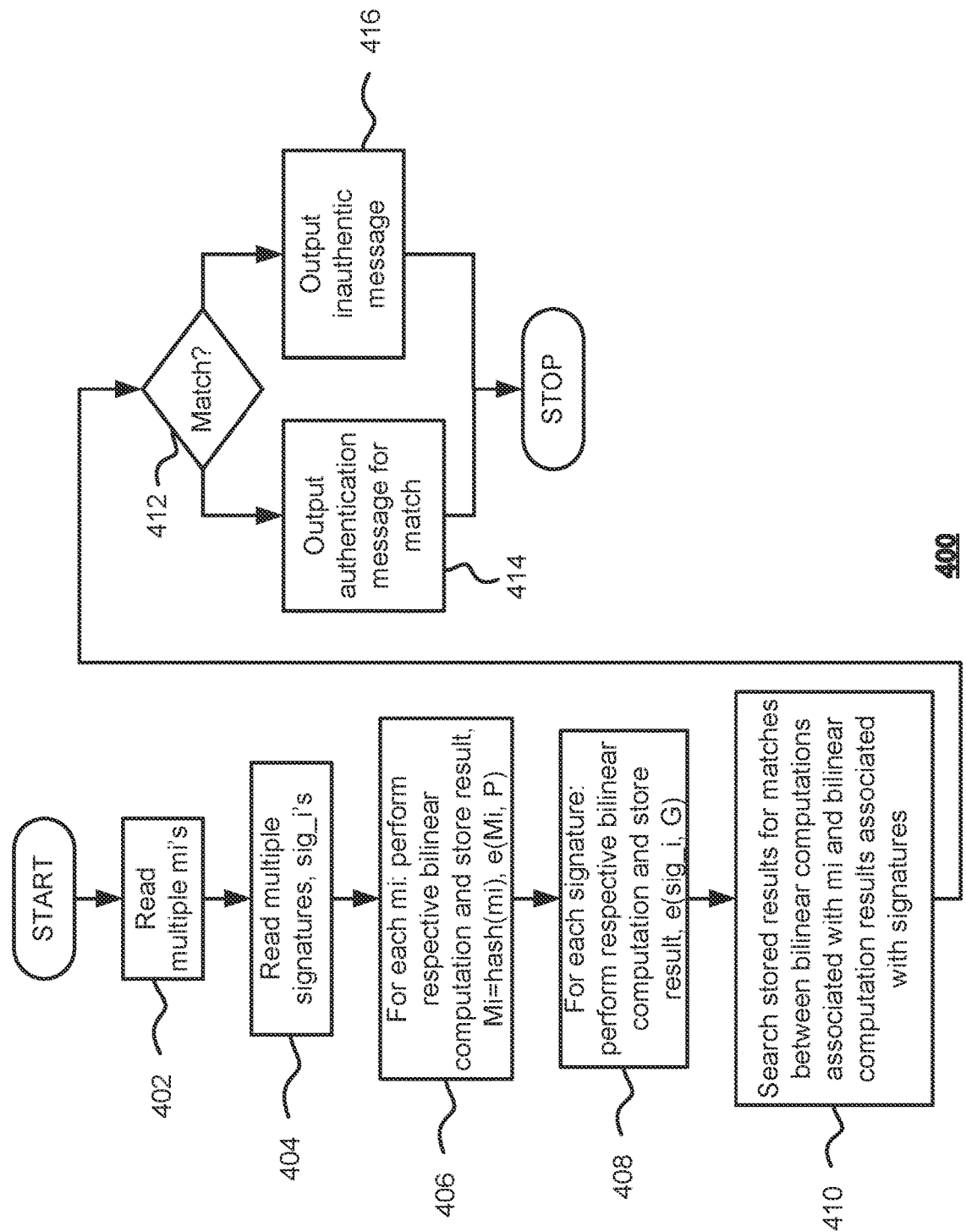
FIG. 4 illustrates a flowchart for authenticating packaged products according to example implementations.

Referring to FIG. 4, there is shown a flowchart 400 for authenticating the number 110 of packaged products 112 to 116 according to example implementations.

At 402 and 404, the authentication data 104 to 108 is read, which comprises reading the product related authentication data, such as, for example, the messages, $m_i$, 120 to 124, and the packaging related authentication data, such as, for example, the signatures 128 to 132.

For each product related authentication data 120 to 124, a respective bilinear computation is performed at 406. Example implementations can be realised in which the respective bilinear computation is $e(M_i,P)$.

For each packaging related authentication data 128 to 132, a respective bilinear computation is performed at 408. Example implementations can be realised in which the respective bilinear computation is $e(\text{sig\_i}, G)$.

Having performed, and stored, all bilinear computations based on all of the read authentication data 104 to 108, a search is performed, at 410, of the bilinear computation results to determine, at 412, whether or not any of the bilinear computation results associated with the product related authentication data 120 to 124 matches with, or otherwise verifies with, any of the bilinear computation results associated with the packaging related authentication information 128 to 132. For each positive determination made, at 412, a message is output, at 414, indicating that a valid, or authentic, product-packaging pair has been identified. For each negative determination made, at 412, a message is output, at 416, indicating that an invalid, or inauthentic, product-packaging pair has been identified. The output messages can comprise an indication of at least one, or both, of which product-packaging pairs are valid or which product-packaging pairs are invalid.

It will be appreciated that the above described entities such as the system 102 and the reader 302 can be realised as hardware, software or a combination of hardware and software, all of which will be referred to herein as "circuitry". Therefore, it will be appreciated that circuitry as used herein can comprise any of physical electronic circuitry, software (such as machine-readable and machine-executable instructions), hardware, application specific integrated circuitry, or the like, taken jointly or severally in any and all permutations.

Accordingly, example implementations also provide machine-readable storage storing such machine-executable instructions. The machine-executable instructions can be executed, that is, processed or interpreted, by a machine or device. The machine or device can comprise one or more processors, or other circuitry, for executing the instructions, implementing the instructions, interpreting the instructions or otherwise processing or giving effect to the instructions.

Figure 5:
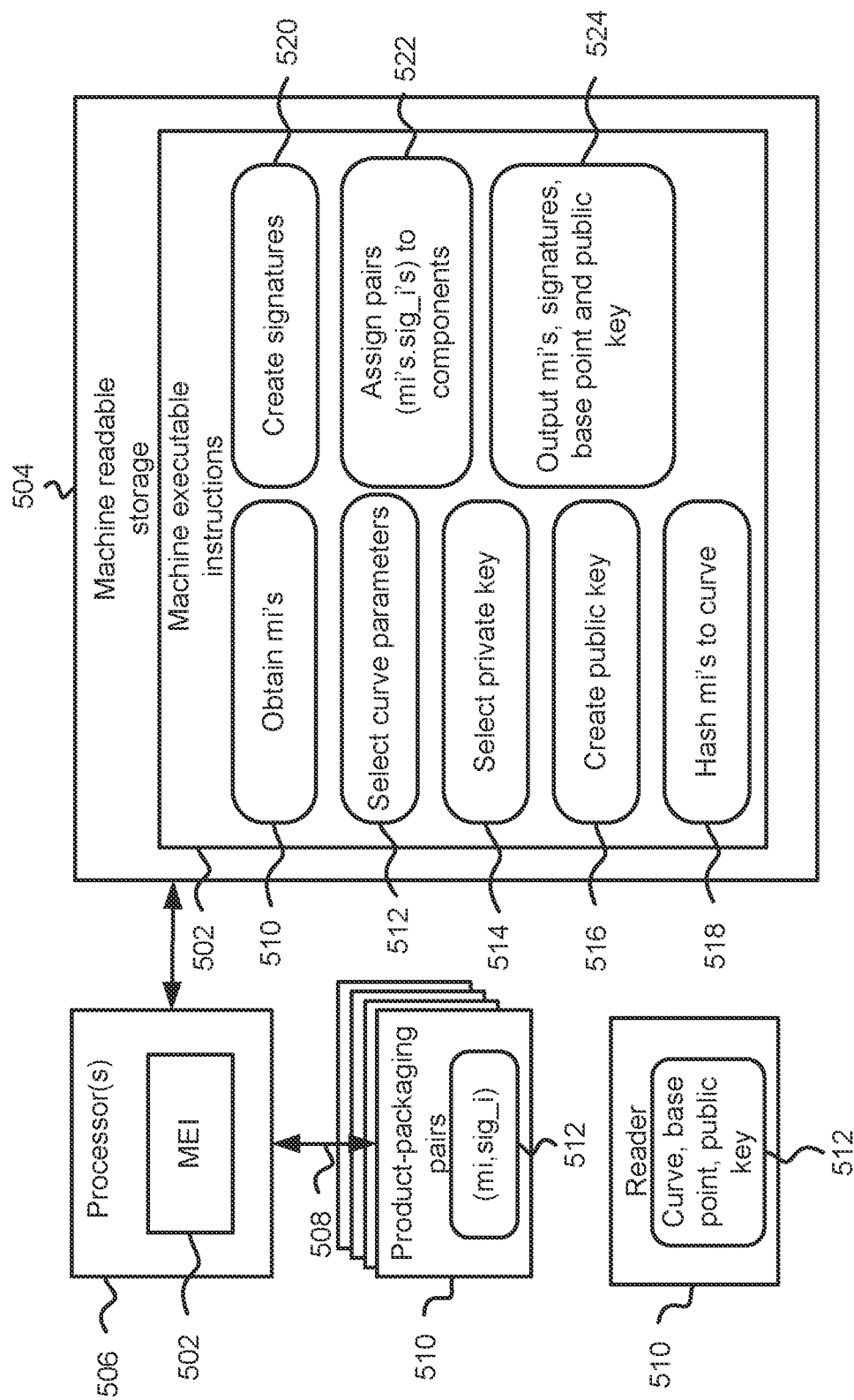
FIG. 5 depicts machine-readable storage storing machine-executable instructions for producing authentic packaged products according to example implementations.
Figure 6:
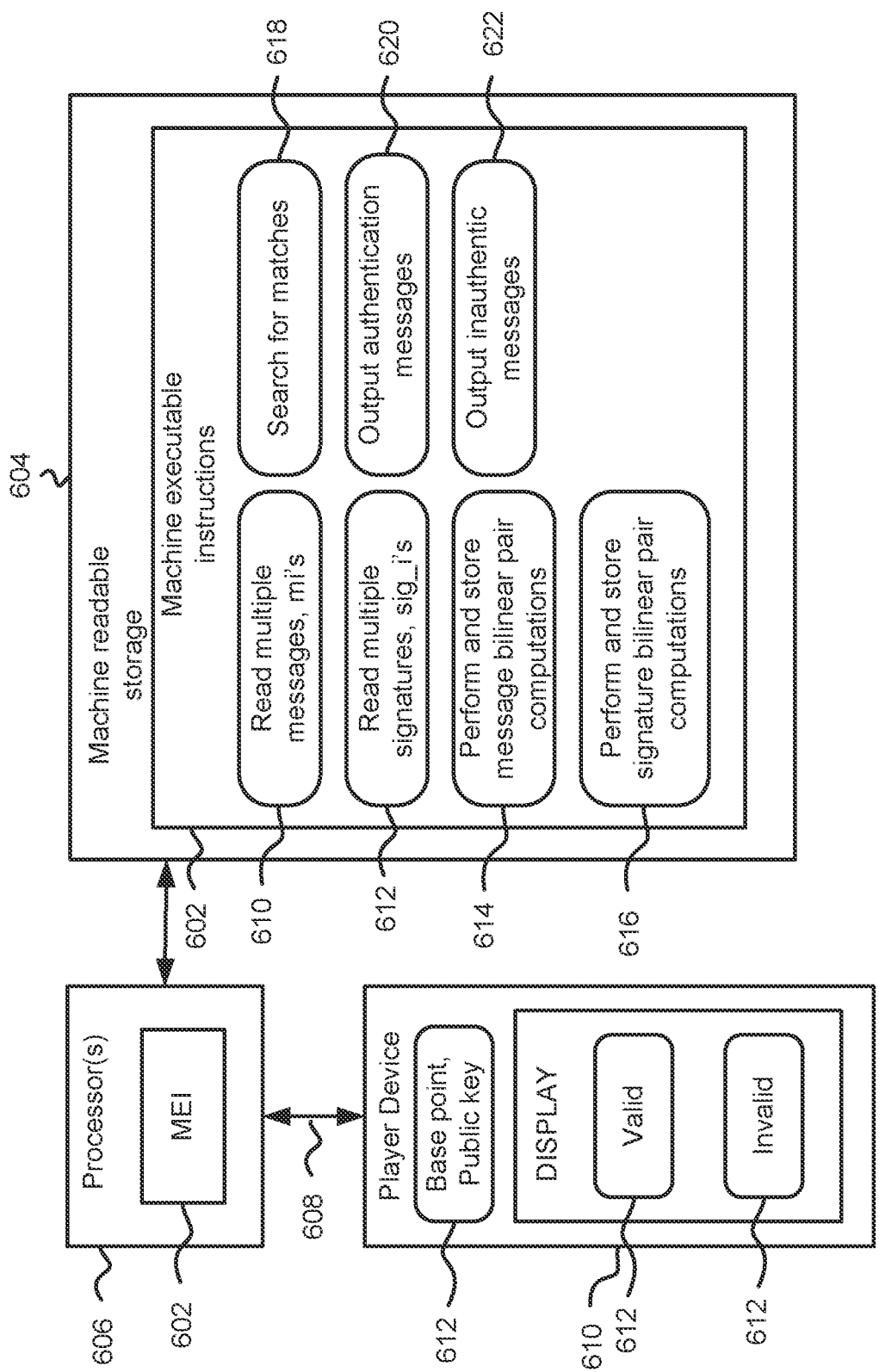
FIG. 6 depicts machine-readable storage storing machine-executable instructions for authenticating packaged products according to example implementations

Therefore, referring to FIGS. 5 and 6, there are shown views 500 and 600 of machine-executable instructions 502 and 602 and machine-readable storage 504 and 604. The machine-readable storage 504 and 604 can be realised using any type of volatile or non-volatile storage such as, for example, memory, a ROM, RAM, EEPROM, or other electrical storage, or magnetic or optical storage or the like. The machine-readable storage 504 and 604 can be transitory or non-transitory. The machine-readable storage 504 or 604 stores the machine-executable instructions (MEIs) 502 and 602. The MEIs 502 and 602 comprise instructions that are executable by a processor or other instruction execution, or instruction implementation, circuitry 506 and 606. The circuitry 506 and 606 are examples of the above processors 118 and 304. The processors or other circuitry 506 and 606 are responsive to executing or implementing the MEIs 502 and 602 to perform any and all activities, operations, or methods described and/or claimed in this application or to realise any of the entities described and/or claimed in this application such as the operations and entities described with reference to at least one or more of FIGS. 1 to 4.

The processor or other circuitry 506 and 606 can output one or more than one set of data, message or signal 508 or 608 to an entity such as, for example, a manufacturing system or apparatus for associating the authentication data 104 to 108 with the correct product-packaging pairs or to the reader 302 taken jointly and severally in any and all permutations.

The MEIs 502 and 602 can comprise MEIs to implement any flowchart described herein or any part thereof taken jointly and severally with any other part thereof, and/or any method described herein.

The machine executable instructions 502 and 602 comprise instructions arranged, when processed or implemented, to realise any and all systems, devices, apparatuses, and methods described and/or depicted in this application.

Accordingly, referring particularly to FIG. 5, there is shown a view 500 of such machine-executable instructions (MEIs) 502 stored on machine-readable storage 504. The instructions comprise instructions arranged, when processed, to implement any or all aspects of at least one, or both, of FIG. 1 or 2. The instructions comprise machine-executable instructions for associating the authentication data 104 to 108 with product-packaging pairs. The MEIs 502 comprise instructions 510 to cause the processor 506 to access the messages, $m_i$, 120 to 124 to be associated with the products or components either individually or collectively and to store the messages, $m_i$, 120 to 124 in the memory 126 or 136. The MEIs 502 comprise instructions 512 to select or access the encryption curve parameters to be used to produce the authentication data 104 to 108. As indicated above, the curve parameters can comprise a pairing-friendly curve, and a base or generator point, G. The MEIs 502 comprise instructions to select or generate, and output, the base or generator point, G, for associating with the above described reader 302. Instructions 514 are additionally provided for selecting or otherwise setting a private key, a, that is used, in conjunction with the curve, by instructions 516 to create a public key, $P=a \cdot G$.

The MEIs 502 further comprise instructions 518 to implement or access a hash to curve function, $M_i=hash(m_i)$, to hash a current message, $m_i$, 120 to 124, to the curve selected above, and instructions 520 to produce a respective signature, sig_i, corresponding to the current product or component message, $m_i$, 120 to 124. The instructions 520 to create the signature can comprise instructions to produce a combination of the private key, a, and the hash to curve of the current message, $m_i$, 120 to 124 such as, for example, a current product or component ID. Example implementations can determine the signature, sig_i, from $sig\_i=a \cdot M_i=a \cdot hash(m_i)$. The MEIs 502 produce paired authentication data 104 to 108 comprising ($m_i$,sig_i). The MEIs 502 also comprise instructions 522 to associate, or assign, the paired authentication data for the current product or component with a current product-packaging pair. Instructions 524 can be provided to output or store the authentication data for a current component or product for association with a respective product-packaging pair.

Referring to FIG. 6, there is shown a view 600 of machine-executable instructions (MEIs) 602 stored on machine-readable storage 604 for authenticating the collection 110 of packaged products 112 to 116. The packaged products 112 to 116 comprise the above described product-packaging pairs each having respective authentication data 104 to 108 as indicated above. The machine-executable instructions 602 can be implemented, executed or otherwise processed by the processor 310 of the above described reader 302.

The MEIs 602 comprise instructions 610 and 612 to read the authentication data 104 to 108, which comprises reading the product related authentication data, that is, the messages, $m_i$, 120 to 124, and the packaging related authentication data, that is, the signatures 128 to 132 respectively.

The MEIs 602 comprise instructions 614 to perform and store the results of a respective bilinear computation for each product related authentication data 120 to 124. Example implementations can be realised in which the instructions 614 realising the respective bilinear computation comprise instructions to compute $e(M_i,P)$.

The MEIs 602 also comprise instructions 616 to perform and store the results of a respective bilinear computation for each packaging related authentication data 128 to 132. Example implementations can be realised in which the instructions to realise the respective bilinear computation comprise instructions to compute $e(sig\_i,G)$.

Having performed, and stored, all bilinear computations based on all of the read authentication data 104 to 108, the MEIs 602 comprise instructions 618 to perform a search of the bilinear computation results to determine whether or not any of the product related authentication data 120 to 124 matches with, or otherwise verifies with, any of the packaging related authentication data 128 to 132. Instructions 620 are additionally provided such that, for each positive determination made or match identified, a message is output indicating that a valid, or authentic, product-packaging pair has been identified. Instructions 622 are also additionally provided such that, for each negative determination made or mismatched identified, a message is output indicating that an invalid, or inauthentic, product-packaging pair has been identified. The output messages can comprise an indication of at least one, or both, of which product-packaging pairs are valid or which product-packaging pairs are invalid.

Although the above example implementations are arranged to use respective pairs of bilinear computation results in assessing whether or not a given product-packaging pair is authentic, which uses respective signatures for each message, example implementations are not limited to such arrangements. Example implementations can be realised in which an aggregate signature, derived from the totality of signatures 128 to 132, is used to assess the authenticity of the collection 110 of product-packaging pairs 112 to 116. The aggregate signature is derived from the sum of the signatures 128 to 132. Therefore, example implementations can be realised in which the aggregate signature is determined as:

agg_sig=$\Sigma_{i=1}^{N}$sig_i, where '+' denotes elliptic curve point addition. In such example implementations, rather than the bilinear computation, e(sig_i,G), associated with each signature 128 to 132 being compared to the bilinear computations, e($M_i$,P), associated with the messages, $m_i$, a bilinear computation associated with the aggregate signature and G, that is, e(agg_sig,G), is compared with a product of bilinear computations associated with all of the hashes to curve, $M_i$, of the messages, $m_i$, corresponding to the signatures 128 to 132 from which the aggregate signature was derived and the point P. If there is a match between those bilinear computations, the group 110 of products 112 to 116 as a whole is assessed or otherwise determined to be authentic or valid. In contrast, if there is a mismatch, the group 110 of product-packaging pairs 112 to 116 as a whole is assessed or otherwise determined to be invalid or inauthentic. Therefore, the comparator 324 would be arranged to evaluate the following:

e(agg_sig,G)=e($\Sigma_{i=1}^{N}$sig_i,G)=$\Pi_{i=1}^{N}$e($M_i$,P), which can give, in example implementations where a message, $m_i$, is the product or component ID, e(agg$_{sig}$,G)=$\Pi_{i=1}^{N}$e(hash($m_i$),P).

Example implementations can be realised in which the authenticity of the collection 110 of product-packaging pairs is assessed or otherwise determined using the aggregate signature, followed by assessing the product-packaging pairs using individual signatures according to FIG. 3, 4 or 6 if the authenticity assessment associated with the aggregate signature is invalid. In such a manner, large quantities of product-packaging pairs can be authenticated, and, in instances of invalidity of a group of product-packaging pairs, individual assessments and comparisons can be made to locate the individual invalid product-packaging pairs. Therefore, efforts to make an illicit profit by unscrupulous suppliers manufacturing and distributing products comprising fake or otherwise inaccurate authentication credentials, or re-using authentic products, such as re-filled printer toner cartridges and pass them off as original, brand new, product can be detected. Such products can be poorer quality, but at the same time purport to be original manufacturer products. Furthermore, such products can be supplied in large quantities, such as on large pallets, in a way that combines authentic products with inauthentic products often buried within the authentic products in a physically inaccessible manner. Therefore, it would be difficult to authenticate all products on such a pallet, and potentially very time consuming given the computational requirements of modern encryption technologies used to authenticate products. Example implementations can dramatically reduce the computational overhead needed to determine at least one, or both, of authentic or inauthentic product-packaging pairs.

Example implementations can be realised according to the following clauses:

Clause 1: A computer program product for authenticating a number of grouped product-packaging pairs in which each product-packaging pair comprises a respective message, associated with a respective product or component, such as, for example, a product or component ID, and a respective signature associated with the message; the computer program product comprising machine executable instructions arranged, when processed or implemented, to:

read the product or component messages and the signatures from the grouped product-packaging pairs;

determine and store bilinear computation results associated with each of the messages, and each of the signatures; and determine, from the stored bilinear results, whether or not the number of grouped product-packaging pairs are authentic.

Clause 2: The computer program product of clause 1, in which the instructions to determine whether or not the number of grouped product-packaging pairs are authentic comprises instructions to:

compare the stored bilinear computation results to determine whether or not at least one of the bilinear computation results associated with a message matches at least one of the bilinear computation results associated with a signature.

Clause 3: The computer program product of either of clauses 1 and 2, in which the instructions to determine whether or not the number of grouped product-packaging pairs are authentic comprises instructions to:

compute, and store, an aggregate signature from the respective signatures, and compute and store a bilinear computation associated with the aggregate signature.

Clause 4: The computer program product of clause 3, in which the instructions to determine whether or not the number of grouped product-packaging pairs are authentic comprises instructions to:

compare the stored bilinear computation results to determine whether or not the bilinear computation result associated with the aggregate signature matches a combination, such as, for example, a sum, product or other combination, of the bilinear computation results associated with the messages.

Clause 5: The computer program product of any preceding clause, in which each paired message and respective signature can be bilinearly paired by a common function e( . . . ) such that e($M_i$,P)=e(sig$_i$,G), where G is a public point of an elliptic curve, a is a private key, P is a public key, P=a·G, $M_i$ is derived from a respective message, $m_i$, such as, for example, a message derived from a product or component ID$_i$, and sig_i is a respective signature associated with the message, $m_i$, such as, for example, $sig_i = a \cdot M_i = a \cdot hash(m_i)$, such as, for example, $sig_i = a \cdot hash(ID_i)$.

Clause 6: The computer program product of any preceding clause, in which the instructions to read at least one, or both, of the messages or the signatures comprise one or more than one of instructions to:

wirelessly access at least the messages or the signatures,
optically access at least the messages or the signatures,
electrically access at least the messages or the signatures,
magnetically access at least the messages or the signatures,
taken jointly and severally in any and all permutations.

Clause 7: A computer program product to allocate paired authentication data to a number of products and respective product packaging; the computer program product comprising machine executable instructions arranged, when processed, to:

generate, for each product and packaging pair, authentication data comprising related product data and packaging data; the product data and packaging data comprising data associated with a product identifier of the product of the product and packaging pair and a signature, derived from an elliptic curve, associated with the product and packaging pair.

Clause 8: The product of clause 7, comprising instructions arranged to:

derive authentication data from the product identifier using a hash function that hashes data associated with the product identifier to the elliptic curve,
select the public point, G, and private key, a, and
generate a public key, $P = a \cdot G$, from the elliptic curve, the public point, G, and the private key, a.

Clause 9: The product of either of clauses 7 and 8, comprising instructions to read immutable, unique identification data associated with an electronic device associated with at least one product of the number of products and respective product packaging and instructions to form the product identifier using the immutable, unique identification data.

Clause 10: The product of clause 9, in which the immutable, unique identification data associated with the electronic device comprises data associated with transponder identification data of an RFID tag.

Clause 11: A method of manufacturing a plurality of grouped product and packaging pairs; the method comprising allocating paired authentication data to the plurality of grouped product and packaging pairs; said allocating comprising:

generating, for each product and packaging pair of the number of products, authentication data comprising paired product data and packaging data; at least one of the product data or packaging data comprising:

data associated with a product identifier of the product of the product and packaging pair, and
a signature, derived from an elliptic curve, associated with the product and packaging pair, and
associating the paired authentication data with respective packaged products; and
grouping the respective product and packaging pairs to form the plurality of grouped product and packaging pairs.

Clause: 12 The method of clause 11, in which generating, for each product and packaging pair, authentication data comprising paired product data and packaging data comprises determining the authentication data from a plurality of parameters associated with an elliptic curve.

Clause 13: The method of clause 12, in which determining the authentication data from a plurality of parameters associated with an elliptic curve comprises:

obtaining a product identifier, $ID_i$, associated with a respective product, determining a point, $hash(ID_i)$, on the elliptic curve associated with the product identifier, $ID_i$,
selecting a further point, G, on the elliptic curve;
selecting private key, a, and
generating a public key, $P = a \cdot G$, from the elliptic curve, the further point, G, and the private key, a.

Clause 14: The method of any of clauses 11 to 13, in which associating the paired authentication data with respective packaged products comprises recording the authentication data on the packages and respective products to facilitate at least one or more than one of:

wirelessly accessing at least the messages or the signatures,
optically accessing at least the messages or the signatures,
electrically accessing at least the messages or the signatures,
magnetically accessing at least the messages or the signatures,
taken jointly and severally in any and all permutations.

Clause 15: A reader for authenticating a number of product-packaging pairs comprising respective authentication data; the reader comprising a processor, memory and a display; the memory storing a computer program product of any of clauses 1 to 6 for processing by the processor.

Clause 16: A collection of packaged products comprising a plurality of products packaged in respective packages; each packaged product comprising respective paired authentication data that associates each product with a respective package; the authentication data comprising paired related product data and packaging data; the product data and packaging data comprising data associated with a product identifier of the product of the product and packaging pair and a signature, derived from an elliptic curve, associated with the product and packaging pair.

Clause 17: The collection of clause 16, in which the authentication data comprises:

an initial point on the elliptic curve derived from a hash function that hashes a message, $m_i$, associated with the product onto the elliptic curve;
a further, public, point, G, on the elliptic curve,
private key, a, and
a public key, $P = a \cdot G$, derived from the elliptic curve, the further, public, point, G, and the private key, a. The message, $m_i$, may comprise identification data, $ID_i$, associated with the product.

Clause 18: A computer program product, method, reader or collection of any preceding clause in which the signatures are Boneh-Lynn-Shacham signatures.

The invention claimed is:

1. A computer program product for authenticating a number of grouped product-packaging pairs, in which each product-packaging pair comprises a respective message, associated with a respective product, and a respective signature associated with the message; the computer program product stored on a non-transitory computer readable medium and comprising instructions that, when executed, cause a processor to:

read the product messages and the signatures from the grouped product-packaging pairs;
determine and store bilinear computation results associated with
   each of the messages, and
   each of the signatures;
determine, from a mismatch in a comparison of an aggregate of each of the signatures of the stored bilinear computation results for the grouped product-packaging pairs, that at least one product-packaging pair of the number of grouped product-packaging pairs is not authentic;
assess, the number of grouped product-packaging pairs using individual signatures to locate an individual invalid product-packaging pair; and
output a message indicating that the individual product-packaging pair is invalid, based on the locating the individual invalid product-packaging pair.

2. The computer program product of claim 1, in which the instructions to determine whether or not the number of grouped product-packaging pairs are authentic comprises instructions, when executed, cause the processor to:
compare the stored bilinear computation results to determine whether or not at least one of the bilinear computation results associated with a message matches at least one of the bilinear computation results associated with a signature.

3. The computer program product of claim 1, in which the instructions to determine whether or not the number of grouped product-packaging pairs are authentic comprises instructions, when executed, cause the processor to:
a. compute, and store, an aggregate signature from the respective signatures, and compute, and store, a bilinear computation associated with the aggregate signature.

4. The computer program product of claim 3, in which the instructions to determine whether or not the number of grouped product-packaging pairs are authentic comprises instructions, when executed, cause the processor to:
a. compare the stored bilinear computation results to determine whether or not the bilinear computation result associated with the aggregate signature matches a combination of the bilinear computation results associated with the messages.

5. The computer program product of claim 1, in which each paired message and respective signature can be bilinearly paired by common function e( . . . ) such that $e(M_i,P)=e(sig_i,G)$,
where G is a public point of an elliptic curve,
a is a private key,
P is a public key, $P=a\cdot G$,
$M_i$ is derived from a respective message, $m_i$, and
sig_i is a respective signature associated with the message, $m_i$.

6. The computer program product of claim 1, in which the instructions to read at least one, or both, of the messages or the signatures comprise at least one or more than one of instructions, when executed, cause the processor to:
a. wirelessly access at least the messages or the signatures,
b. optically access at least the messages or the signatures,
c. electrically access at least the messages or the signatures, or
d. magnetically access at least the messages or the signatures.

7. A computer program product to allocate paired authentication data to a group of products and respective product packaging, the computer program product stored on a non-transitory computer readable medium and comprising machine executable instructions that, when executed by a processor, cause the processor to:
generate, for each product and packaging pair, paired authentication data comprising paired related product data and packaging data, wherein the paired related product data and packaging data comprises:
   data associated with a product identifier of the product of the product and packaging pair, and
   a signature derived from an elliptic curve, wherein the signature is associated with the product and packaging pair;
determine, from a mismatch in a comparison of an aggregate of the paired authentication data for the group of the product and packaging pairs that at least one product and packaging pair of the group is not authentic;
assess the group of the product and packaging pairs using individual signatures to locate an individual invalid product and packaging pair; and
outputting a message indicating that the individual product and packaging pair is invalid, based on the locating the individual invalid product and packaging pair.

8. The product of claim 7, comprising instructions, when executed, cause the processor to:
a. derive authentication data from the product identifier using a hash function that hashes data associated with the product identifier to the elliptic curve,
b. select a public point, G, and private key, a, and
c. generate a public key, $P=a\cdot G$, from the elliptic curve, the public point, G, and the private key, a.

9. The product of claim 7, comprising instructions, when executed, cause the processor to:
read immutable, unique identification data associated with an electronic device associated with at least one product of the group of products and respective product packaging; and
form the product identifier using the immutable, unique identification data.

10. The product of claim 9, in which the immutable, unique identification data associated with the electronic device comprises data associated with transponder identification data of an RFID tag.

11. A method of manufacturing a plurality of grouped product and packaging pairs, the method comprising:
allocating paired authentication data to the plurality of grouped product and packaging pairs by at least:
   generating, for each product and packaging pair of a number of products, authentication data comprising paired product data and packaging data comprising:
      message data associated with the product of the product and packaging pair, and
      a signature, derived from an elliptic curve, associated with the product and packaging pair
   associating the paired authentication data with respective product and packaging pairs;
   grouping the respective product and packaging pairs to form the plurality of grouped product and packaging pairs;
determining, from a mismatch in a comparison of an aggregate of the authentication data that at least one product and packaging pair of the grouped product and packaging pairs is not authentic; and
assessing the grouped product and packaging pairs using individual signatures to locate an individual invalid product-packaging pair; and outputting a message indicating that the individual product-packaging pair is invalid, based on the locating the individual invalid product-packaging pair.

12. The method of claim 11, in which generating, for each product and packaging pair of the grouped product and packaging pairs, authentication data comprising paired product data and packaging data comprises determining the authentication data from a plurality of parameters associated with an elliptic curve.

13. The method of claim 12, in which determining the authentication data from a plurality of parameters associated with an elliptic curve comprises:

obtaining a message, $m_i$, associated with a respective product, determining a point, $M_i$=hash($m_i$), on the elliptic curve associated with the message, $m_i$, selecting a further point, G, on the elliptic curve;

selecting private key, a, and generating a public key, P=a·G, from the elliptic curve, the further point, G, and the private key, a.

14. The method of claim 11, in which associating the paired authentication data with respective packaged products comprises recording the authentication data on the packages and respective products to facilitate at least one or more than one of wirelessly accessing at least the messages or the signatures, optically accessing at least the messages or the signatures, electrically accessing to at least the messages or the signatures, or magnetically accessing at least the messages or signatures.

15. The computer program of claim 1, in which the signatures are Boneh-Lynn-Shacham signatures.

* * * * *